US010227084B2

(12) United States Patent
Mori et al.

(10) Patent No.: US 10,227,084 B2
(45) Date of Patent: *Mar. 12, 2019

(54) STEERING SYSTEM OF SADDLE-RIDE TYPE VEHICLE

(71) Applicant: HONDA MOTOR CO., LTD., Tokyo (JP)

(72) Inventors: Yotaro Mori, Wako (JP); Hisakazu Yasui, Wako (JP); Makoto Araki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,164

(22) Filed: Sep. 12, 2016

(65) Prior Publication Data

US 2017/0088161 A1    Mar. 30, 2017

(30) Foreign Application Priority Data

Sep. 28, 2015  (JP) ................. 2015-190108

(51) Int. Cl.
| | |
|---|---|
| *B62K 21/02* | (2006.01) |
| *B62K 21/12* | (2006.01) |
| *B62D 5/04* | (2006.01) |
| *B62K 25/08* | (2006.01) |
| *B62K 11/04* | (2006.01) |

(52) U.S. Cl.
CPC ......... *B62D 5/0409* (2013.01); *B62D 5/0403* (2013.01); *B62K 11/04* (2013.01); *B62K 21/02* (2013.01); *B62K 25/08* (2013.01)

(58) Field of Classification Search
CPC .. B62D 5/0409; B62D 5/0412; B62D 5/0421; B62K 21/02; B62K 21/04
See application file for complete search history.

(56) References Cited

U.S. PATENT DOCUMENTS

| | | | |
|---|---|---|---|
| 7,878,292 B2 | 2/2011 | Hikichi et al. | |
| 8,606,464 B2 | 12/2013 | Suzuki | |
| 8,620,525 B2 | 12/2013 | Araki et al. | |
| 9,359,037 B2 | 6/2016 | Kuwabara et al. | |
| 2008/0303258 A1* | 12/2008 | Kuo ....................... | B62K 21/08 280/755 |

(Continued)

FOREIGN PATENT DOCUMENTS

| | | |
|---|---|---|
| JP | H02-189295 A | 7/1990 |
| JP | 04-169386 A | 6/1992 |

(Continued)

OTHER PUBLICATIONS

United States Patent and Trademark Office, Office Action corresponding to U.S. Appl. No. 15/240,121, dated Jan. 23, 2018.

(Continued)

*Primary Examiner* — Tony H Winner
(74) *Attorney, Agent, or Firm* — Squire Patton Boggs (US) LLP

(57) ABSTRACT

An assist motor generates a steering assist force that assists a steering force transmitted to a steering shaft. A steering assist force transmit member is turnably supported by steering stem, and an assist steering system link joins a steering arm and a steering assist force transmit member. The assist motor is disposed adjacent to an assist steering system link.

12 Claims, 6 Drawing Sheets

(56) References Cited

U.S. PATENT DOCUMENTS

| | | | |
|---|---|---|---|
| 2009/0076684 A1* | 3/2009 | Seidl | B62K 21/00 701/42 |
| 2009/0139793 A1* | 6/2009 | Suzuki | B62K 21/00 180/446 |
| 2014/0129087 A1* | 5/2014 | Takenaka | B62K 21/00 701/41 |
| 2014/0284899 A1* | 9/2014 | Takenaka | B62K 21/00 280/279 |
| 2016/0280314 A1 | 9/2016 | Taguma et al. | |
| 2017/0088229 A1* | 3/2017 | Mori | B62D 5/04 |

FOREIGN PATENT DOCUMENTS

| | | |
|---|---|---|
| JP | 2003-072656 A | 3/2003 |
| JP | 2012-076490 A | 4/2012 |
| JP | 2013-075589 A | 4/2013 |
| JP | 2014-184934 A | 10/2014 |

OTHER PUBLICATIONS

United States Patent and Trademark Office, Office Action corresponding to related U.S. Appl. No. 15/268,763, dated Mar. 20, 2018.

\* cited by examiner

STEERING SYSTEM OF SADDLE-RIDE TYPE VEHICLE

BACKGROUND

Field

The present invention relates to a steering system of a saddle-ride type vehicle.

Description of the Related Art

In the past, in a steering system of a saddle-ride type vehicle, there was one disclosed in JP-A No. 2012-076490 (Patent Literature 1) for example. In the steering system, a power assist unit that transmits a steering assist force to a steering shaft is provided, and an electric motor of the power assist unit is attached to the bottom bridge side of a head pipe through a support transmit member.

On the other hand, in a front wheel suspension device of a motorcycle, there is one disclosed in JP-A No. H4-169386 (Patent Literature 2) for example. In the front wheel suspension device, a steering shaft link is arranged within a steering tube unit of a front fork that supports the front wheel, and the upper and lower ends of the steering shaft link protruding to the outside of the steering tube unit are supported by a body frame through a swing arm that is arranged in a vertically swingable manner.

In the meantime, in such front wheel suspension device, because it was difficult to incorporate an assist steering system that transmitted a steering assist force to a steering shaft while saving a space, there was a problem that the steering system was enlarged.

SUMMARY

Therefore, an object of the present invention is to suppress enlargement of a steering system in the steering system of a saddle-ride type vehicle which includes a front fork that includes a steering shaft at the upper end and supports a front wheel at the lower end, a steering arm attached to the steering shaft, a steering force transmit member that is turnably supported by a steering stem that is arranged in a body frame, and a steering system link that joins the steering arm and the steering force transmit member.

As a solution to the above-described problem, certain embodiments of the invention include a steering system of a saddle-ride type vehicle, including a front fork that includes a steering shaft at the upper end and supports a front wheel at the lower end. A steering arm is attached to the steering shaft, and a steering force transmit member that is turnably supported by a steering stem is arranged in a body frame. A steering system link joins the steering arm and the steering force transmit member. An assist motor generates a steering assist force that assists a steering force transmitted to the steering shaft, and a steering assist force transmit member is turnably supported by the steering stem. An assist steering system link joins the steering arm and the steering assist force transmit member are further provided. The assist motor is disposed adjacent to the assist steering system link.

In certain embodiments, the assist motor is disposed between the steering shaft and the steering stem in side view.

In certain embodiments, the body frame is connected to a rear end of a swing arm that extends vehicle forward and rearward and is made vertically swingable. A front end of the swing arm is connected to a fork holder that steerably supports the front fork, and at least a part of the assist motor overlaps with the swing arm in side view.

In certain embodiments, the assist motor includes a motor body, and an output shaft that outputs rotational drive of the motor body as the steering assist force. A steering assist force transmit mechanism transmits the steering assist force outputted by the output shaft to the steering shaft. The motor body is disposed downward of the steering assist force transmit mechanism, and the output shaft is directed upward.

In certain embodiments, at least a part of the steering assist force transmit mechanism overlaps with the assist steering system link in side view.

In certain embodiments, a stay supports vehicle components, and is attached to the body frame. The stay is provided with an assist motor support section that supports the assist motor.

Because in some embodiments the assist motor is disposed adjacent to the assist steering system link, a space adjacent to the assist steering system link can be effectively utilized in disposing the assist motor. Therefore, enlargement of the steering system can be suppressed.

Because in some embodiments the assist motor is disposed between the steering shaft and the steering stem in side view, the assist motor comes to be positioned rearward of the front fork. Therefore, the assist motor can be protected easily.

Because in some embodiments at least a part of the assist motor overlaps with the swing arm in side view, a space at the side of the swing arm can be effectively utilized in disposing the assist motor. Therefore, the assist motor can be disposed compactly.

Because in some embodiments the motor body is disposed downward of the steering assist force transmit mechanism and the output shaft is directed upward, compared to the case the motor body is disposed upward of the steering assist force transmit mechanism and the output shaft is directed downward, the motor body that is relatively heavy in the assist motor can be disposed at a low position. Therefore, the position of the center of gravity of the vehicle can be lowered.

Because in some embodiments at least a part of the steering assist force transmit mechanism overlaps with the assist steering system link in side view, a space at the side of the assist steering system link can be effectively utilized in disposing the steering assist force transmit mechanism. Therefore, the steering assist force transmit mechanism can be disposed compactly.

Because in some embodiments the assist motor support section that supports the assist motor is arranged in the stay, compared to the case a support member for supporting the assist motor is arranged separately and independently, the number of pieces of components can be suppressed. Also, compared to the case the assist motor is not supported, the vibration of the assist motor can be reduced.

DETAILED DESCRIPTION

Figure 1:
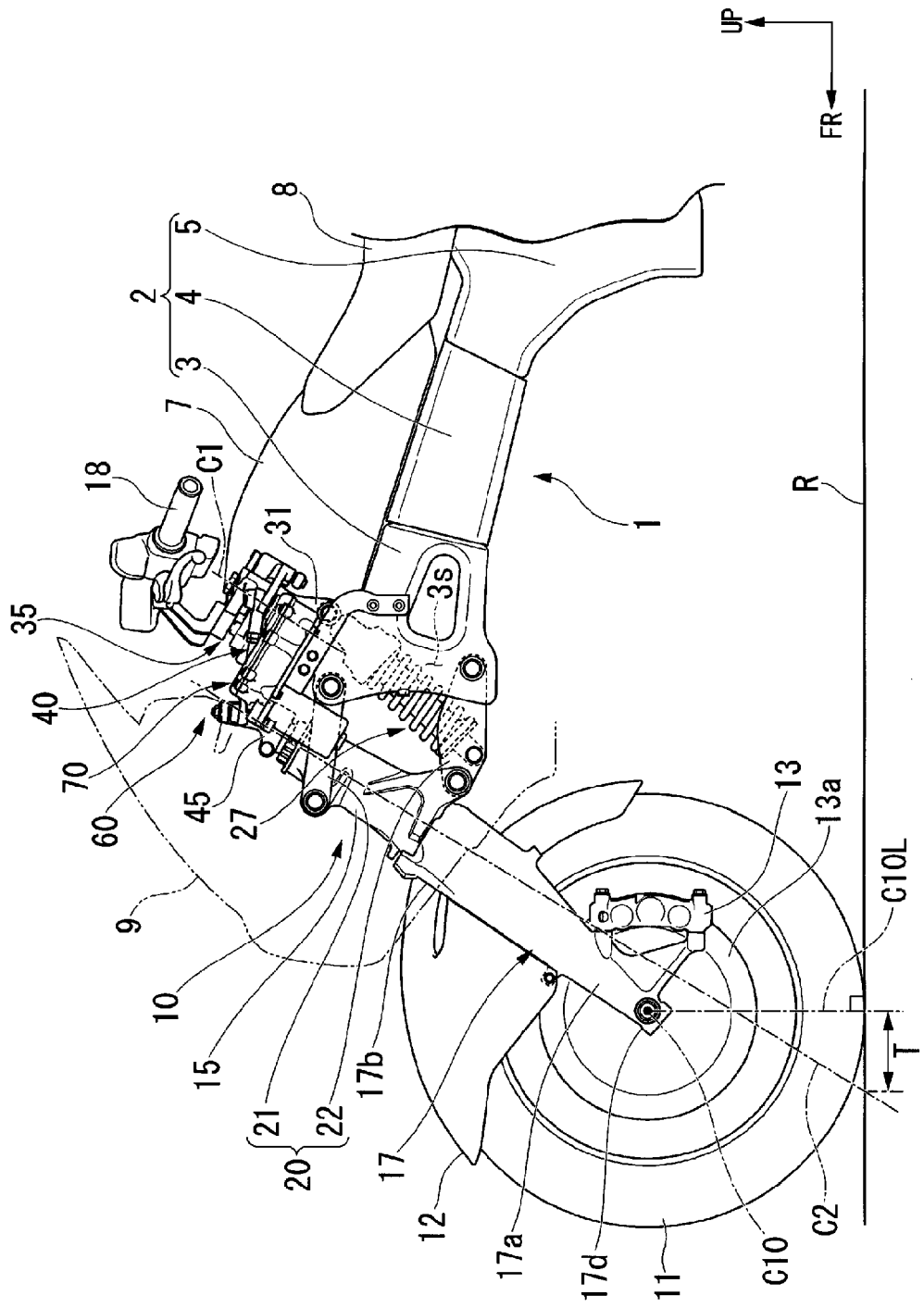
FIG. 1 is a left side view of the vehicle body front part of a motorcycle in an embodiment of the present invention.

Embodiments according to the present invention will be described below with reference to the drawings. Also, the direction such as front, rear, left, and right in the description below shall be with reference to the direction in the vehicle described below unless otherwise stated. Further, in the right place in the drawing, used in the description below, there are shown an arrow FR denoting vehicle forward, an arrow LH denoting vehicle left hand, an arrow UP denoting vehicle upward, and a vehicle left-and-right center line CL.

Figure 5:
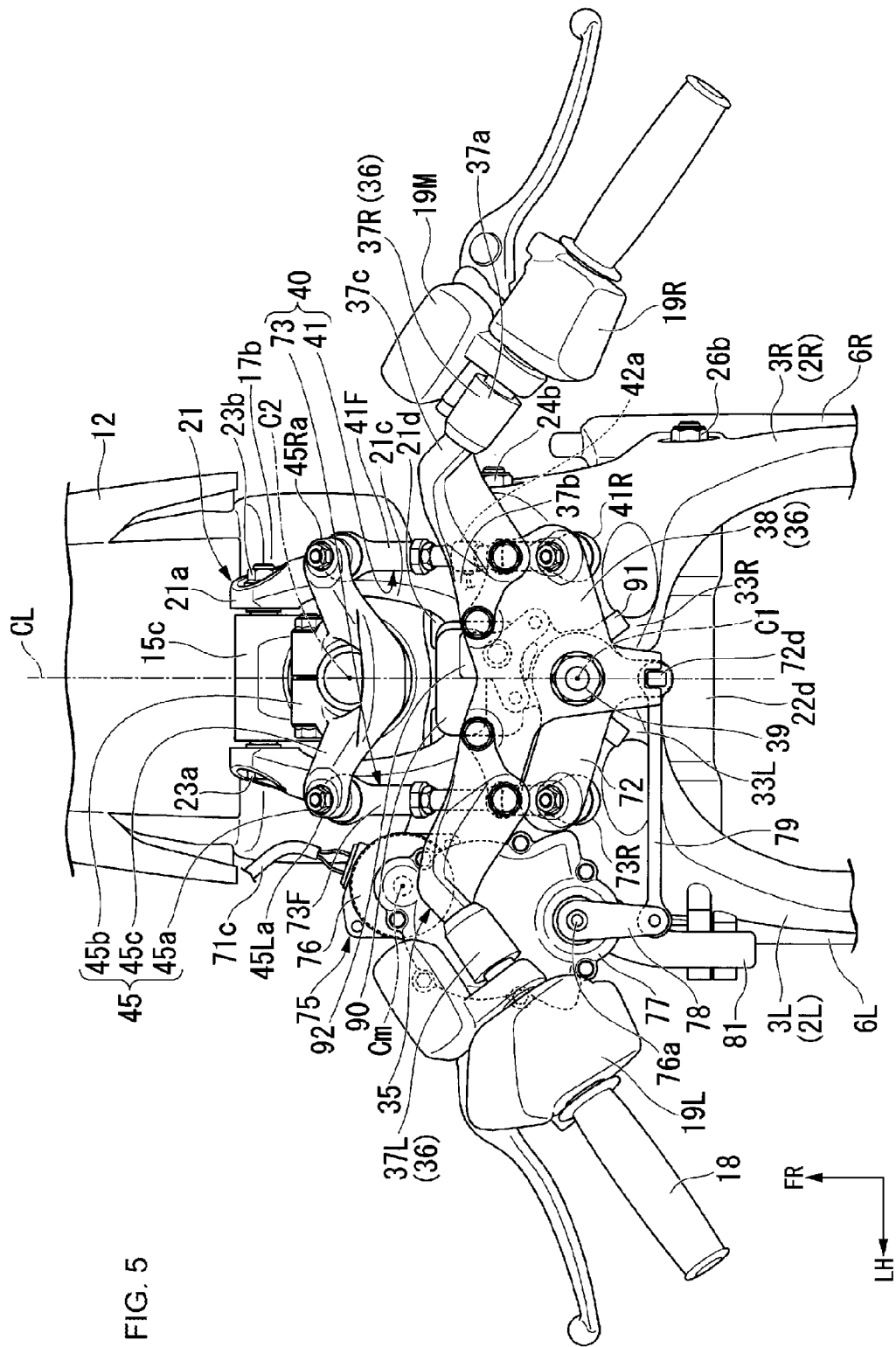
FIG. 5 is a drawing of the steering system as viewed from a direction along the steering stem.

FIG. 1 shows the vehicle body front part of a motorcycle as an example of a saddle-ride type vehicle. With reference to FIG. 1 and FIG. 5, a body frame 1 of a motorcycle includes a front block 3 that supports a front wheel suspension device 10 at the front end, and is provided with a pair of left and right main frames 2 that extend in the vehicle longitudinal direction. Also, the reference sign 2L in FIG. 5 denotes a left main frame, and the reference sign 2R denotes a right main frame. Further, the reference sign 3L in FIG. 5 denotes a left front block, and the reference sign 3R denotes a right front block.

With reference to FIG. 1, the left and right main frames 2 include, in an integrated manner, front blocks 3 having such a shape that the front-and-rear width is larger as it goes forward in side view, a pivot section 5 that supports a rear wheel suspension device not illustrated, and a joining section 4 that extends so as to incline moderately so as to be positioned downward as it goes rearward from the rear end of the front block 3 and extends between the rear end of the front block 3 and the front upper end of the pivot section 5.

In a space below the main frames 2, an engine (not illustrated) for example is mounted. Above the front block 3 and the joining section 4, a fuel tank 7 is disposed. Above the pivot section 5, a seat 8 is disposed. The vehicle body front part of the motorcycle is covered with a front cowl made of a synthetic resin.

Although it is not illustrated, the front block 3 has such a gate shape (inverted V-shape) of reducing the left-and-right width as it goes upward as viewed from the front and opening downward. In FIG. 1, the lower open section of the gate shape in the front block 3 is denoted by the reference sign 3s.

Figure 2:
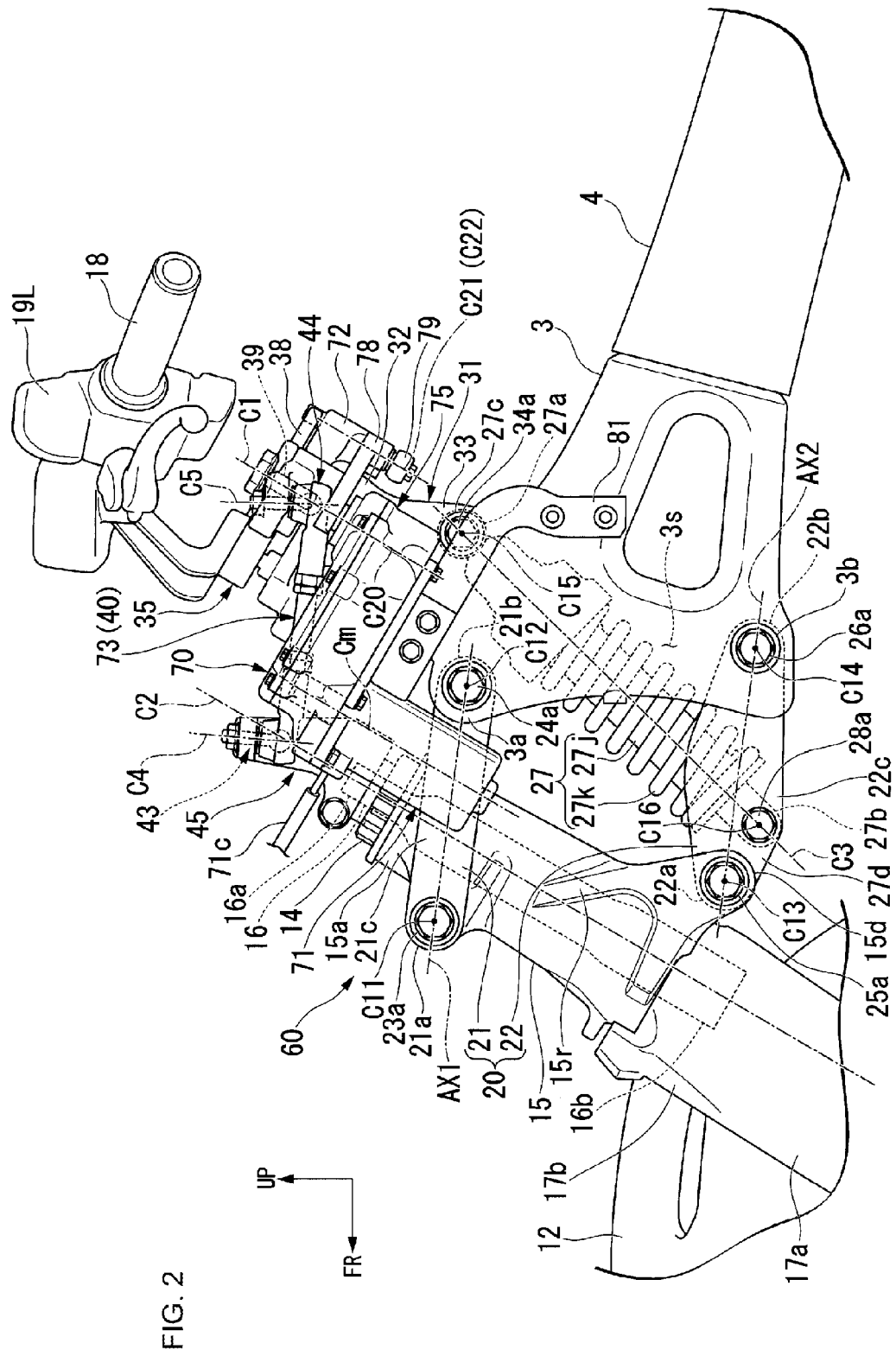
FIG. 2 is a left side view of the steering system of the motorcycle.

In addition, with reference to FIG. 2, in the front upper end of the front block 3, an upper connection section 3a is formed to which a rear end 21b of an upper arm 21 is connected. In the front upper part of the front block 3 and rearward of the upper connection section 3a, a handlebar support section 31 that supports a handlebar 18 is formed so as to extend rearward and upward. In the front lower part of the front block 3, a lower connection section 3b is formed to which a rear end 22b of a lower arm 22 is connected.

With reference to FIG. 1, FIG. 2, and FIG. 5, a front wheel suspension device 10 includes a front fork 17 that includes a steering shaft 16 at the upper end and supports a front wheel 11 at the lower end. A steering arm 45 is attached to the steering shaft 16, a handlebar post 35 includes a steering force transmit member 38 turnably supported by a steering stem 39 arranged in the body frame 1, and a fork holder 15 turnably (steerably) supports the front fork 17. A steering system link 41 joins the steering arm 45 and the steering force transmit member 38, and a swing arm 20 includes upper and lower arms 21, 22 that extend in the vehicle longitudinal direction and support the front wheel 11 in a vertically swingable manner. A cushion member 27 that extends and shrinks accompanying the movement of the front wheel 11 and obtains a damping action. Through these handlebar post 35, steering system link 41, steering arm 45, fork holder 15, and front fork 17, turning around a steering stem axis C1 accompanying the operation of the handlebar 18 and steering of the front wheel 11 are interlocked. The handlebar post 35, the steering system link 41, the steering arm 45, the fork holder 15, and the front fork 17 form a steering system 60.

The steering force transmit member 38 is turned around the steering stem axis C1 accompanying the operation of the handlebar 18. By turning the steering force transmit member 38, a steering force is transmitted to the steering shaft 16 through the steering system link 41. By transmission of the steering force to the steering shaft 16, the front fork 17 is turned around a steering shaft axis C2.

Here, the steering stem axis C1 is the turning axis of the handlebar post 35 that is rotated accompanying the operation of the handlebar 18, and agrees with the center axis of a boss section 32 of a cylindrical shape in the handlebar support section 31. The steering shaft axis C2 is the turning axis of the front fork 17 that is turned accompanying the operation of the handlebar 18, and agrees with the center axis of the fork holder 15 of a cylindrical shape. The angle of the steering shaft axis C2 with respect to the vertical direction becomes "caster angle". The steering shaft axis C2 offsets (departs) forward of the steering stem axis C1 in side view. The steering shaft axis C2 and the steering stem axis C1 are generally parallel to each other.

With reference to FIG. 1 and FIG. 2, the front fork 17 includes, in an integrated manner, the steering shaft 16 that forms the steering shaft axis C2, a pair of left and right arm sections 17a that incline to be positioned rearward as it goes upward in side view and extend vertically, and a cross member 17b that joins the upper ends of the left and right arms 17a. The left and right arms 17a are disposed on both left and right sides of the front wheel 11. The cross member 17b curves inward in the vehicle width direction so as to line the tread surface of the upper end position of the front wheel 11, and is disposed between the upper ends of the left and right arm sections 17a. The left and right ends of the cross member 17b are joined to the upper ends of the left and right arms 17a. Respective elements of the front fork 17 are integrated aluminum components for example, and the respective elements are weld-joined so as to be integrated with each other.

The steering shaft 16 of the front fork 17 is supported by the fork holder 15 so as to be turnable around the steering shaft axis C2 at the inner side in the radial direction of the fork holder 15 of a cylindrical shape. An upper end 16a of the steering shaft 16 of the front fork 17 is connected to the steering arm 45.

Although it is not illustrated, at the upper end of the cross member 17b, a journal section is formed to which a lower end 16b of the steering shaft 16 is connected. In the journal section of the cross member 17b, an insertion hole (not illustrated) is formed which opens in a direction the steering shaft 16 extends. By inserting the steering shaft 16 through the insertion hole from the upper end 16a and joining the lower end 16b of the steering shaft 16 and the journal section by welding in a state the lower end 16b of the steering shaft 16 is positioned to the insertion hole, the upper end of the cross member 17b is fixed to the lower end 16b of the steering shaft 16.

With reference to FIG. 1, to the lower end 17d of the left and right arms 17a, an axle of the front wheel 11 (hereinafter referred to as "front wheel axle") is connected. For example, both ends in the vehicle width direction of the front wheel axle are fixed to lower ends 17d of the left and right arm sections 17a through ball bearings not illustrated. A wheel of the front wheel 11 is turnably supported at the center in the vehicle width direction of the front wheel axle. By the cross member 17b, a front fender 12 is supported through bolts not illustrated.

Also, the reference sign 13 in FIG. 1 denotes a brake caliper. Further, the reference sign 13a denotes a brake rotor. Furthermore, the reference sign C10 denotes the center axis of the front wheel axle. In addition, the reference sign C10L denotes the perpendicular lowered from a center axis C10 to a road surface R. Also, the reference sign T denotes a trail.

With reference to FIG. 2, the handlebar support section 31 is arranged so as to incline rearward with respect to the vertical line at the front upper end of the front block 3 in side view. The handlebar support section 31 is arranged so as to be integrated with the upper end of the front block 3 made of aluminum for example. The handlebar support section 31 turnably (steerably) supports the handlebar post 35.

With reference to FIG. 2 and FIG. 5 together, in other words, the handlebar support section 31 is formed of the boss section 32 of a cylindrical shape which forms the steering stem axis C1, and a left and right extension section 33 that extends rearward and upward from the front upper end of the front block 3 so that the upper side is positioned inward in the vehicle width direction and is connected to the lower end of the boss section 32. Also, the reference sign 33L in FIG. 5 denotes the left extension section, and the reference sign 33R denotes the right extension section.

In the left and right extension sections 33L, 33R, a bolt 34a as a joining shaft that extends along the vehicle width direction and joins the left and right extension sections 33L, 33R is arranged. In the left and right extension sections 33L, 33R, a cushion upper connection section 27c is formed to which an upper end 27a of the cushion member 27 is connected. At the upper end of the boss section 32, the handlebar post 35 is arranged so as to be turnable around the steering stem axis C1.

Figure 3:
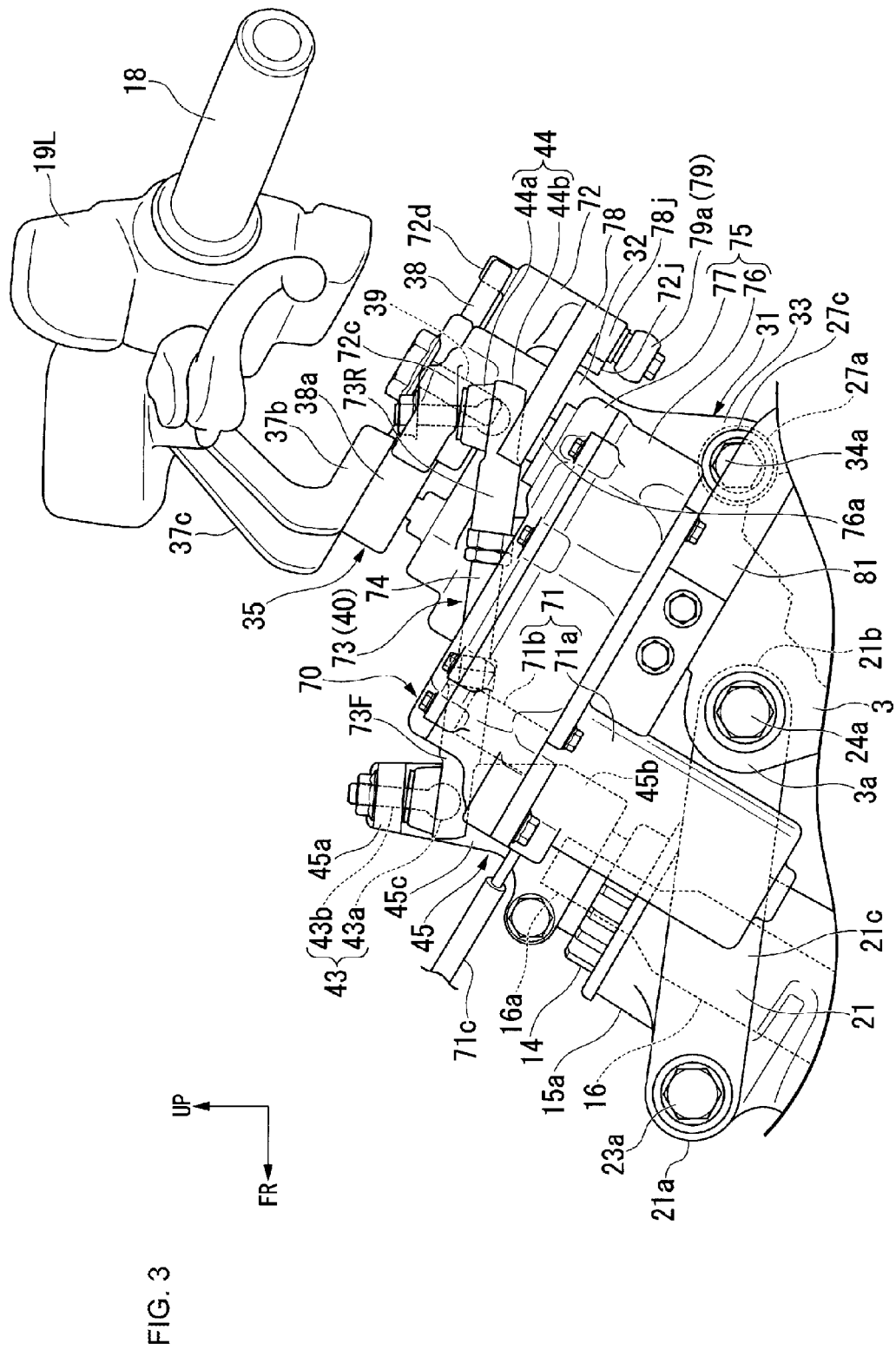
FIG. 3 is a left side view of the periphery of a linkage link of the steering system.

With reference to FIG. 3 and FIG. 5, the handlebar post 35 is formed of a holder 36 to which the handlebar 18 is fixed, and the steering stem 39 that is connected to the lower part of the holder 36 and makes the steering stem axis C1 the center axis. The holder 36 includes the steering force transmit member 38 that has a thickness in a direction parallel to the steering stem axis C1, has a notch section in the side part in the left, and has a fan shape having a larger right-left width as it goes forward as viewed from a direction along the steering stem 39, and left and right extension sections 37L, 37R that are connected to the front left and right both ends of the steering force transmit member 38 and extend rearward and upward so as to form an L-shape in side view.

The steering stem 39 is turnably supported by the inner side in the radial direction of the boss section 32 through ball bearings (not illustrated). The steering force transmit member 38 is supported by the upper end of the steering stem 39 so as to be turnable around the steering stem axis C1 through a collar and ball bearings (both are not illustrated). In addition, with reference to FIG. 6, at the right end of the steering force transmit member 38, a steering system link rear connection section 38c is formed to which the rear end of the steering system link 41 is connected. To the steering force transmit member 38, a steering force transmit member side extension section 38e is formed that extends rearward making the left-right center line the vehicle left-right center line CL as viewed from a direction along the steering stem 39.

Figure 6:
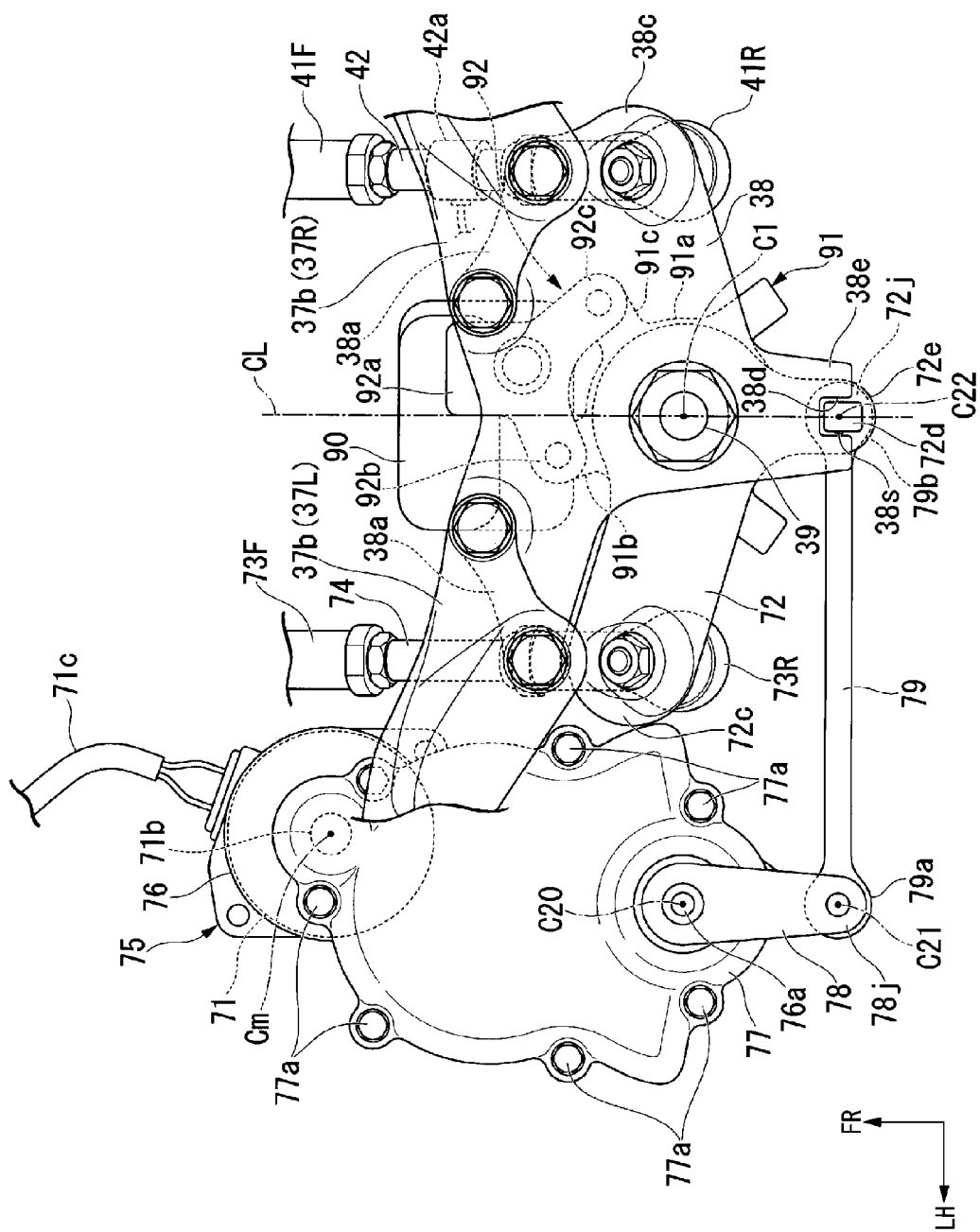
FIG. 6 is a drawing when a power assist unit of the steering system is viewed from a direction along the steering stem.

With reference to FIG. 3, FIG. 5, and FIG. 6, the left and right extension sections 37L, 37R include, in an integrated manner, a handlebar connection section 37a to which the inner end in the vehicle width direction of the handlebar 18 is connected, a first extension section 37b that is connected to a handlebar attaching section 38a arranged at the left and right ends of the steering force transmit member 38 and extends forward and upward in side view so as to line the slope of the steering force transmit member 38, and a second extension section 37c that extends rearward and upward from the front upper end of the first extension section 37b and is connected to the handlebar connection section 37a. The handlebar attaching section 38a is disposed forward of the steering stem 39 in side view. With reference to FIG. 6, the first extension section 37b of the left and right extension sections 37L, 37R is fastened and fixed to the handlebar attaching section 38a by plural (for example 2 pieces each for the left and the right in the present embodiment) fastening members (bolts).

Because the steering force transmit member 38 is turnably supported by the steering stem 39, the handlebar post 35 is made turnable (steerable) around the steering stem axis C1 accompanying the operation of the handlebar 18.

The reference sign 19L in the drawing denotes a left switch box that includes a switch group of a dimmer switch, a blinker switch, and the like. Also, the reference sign 19R in FIG. 5 denotes a right switch box that includes a switch group of a kill switch, and the like. Further, the reference sign 19M in FIG. 5 denotes a master cylinder that is joined to a brake lever.

With reference to FIG. 2, the fork holder 15 is arranged forward of the steering stem axis C1 so as to be apart from the front block 3. In other words, the fork holder 15 has a cylindrical shape, and is arranged forward of the front block 3 so as to incline rearward with respect to the vertical direction. The fork holder 15 supports the steering shaft 16 of the front fork 17 in the inner side in the radial direction thereof so as to be turnable (steerable) around the steering shaft axis C2. The upper end 16a of the steering shaft 16 protrudes upward of an upper end 15a of the fork holder 15. Also, the steering shaft 16 and the fork holder 15 make the steering shaft axis C2 the center axis.

In a state the upper end 16a of the steering shaft 16 protrudes upward of an upper end 15a of the fork holder 15, a ball bearing (not illustrated) that turnably supports the steering shaft 16 is incorporated between the steering shaft 16 and the fork holder 15 from the side of the upper end 16a of the steering shaft 16. The reference sign 14 in the drawing denotes a slippage preventing member that is inserted into the steering shaft 16 from the side of the upper end 16a of the steering shaft 16 and prevents slipping-off of the bearing.

With reference to FIG. 2 and FIG. 5, in the front upper part of the fork holder 15, an upper connection section 15c to which a front end 21a of the upper arm 21 is connected is formed so as to protrude forward and upward. In the rear lower part of the fork holder 15, a lower connection section 15d to which a front end 22a of the lower arm 22 is connected is formed so as to protrude rearward and downward. The upper connection section 15c is disposed forward of the steering shaft axis C2 in side view, and the lower connection section 15d is disposed rearward of the steering shaft axis C2 in side view. On the left and right side surfaces of the fork holder 15, a rib 15r for reinforcing the lower connection section 15d is formed. The rib 15r has a V-shape that opens forward and upward in side view, and extends so as to diverge forward and upward from the lower connection section 15d so that the rib height increases as it goes to the lower connection section 15d side.

With reference to FIG. 3 and FIG. 5, the steering arm 45 is supported in a level higher than the upper end 15a of the fork holder 15 by the upper end 16a of the steering shaft 16. The steering arm 45 includes, in an integrated manner, a link front connection section 45a to which the front end of an interlocking link 40 is connected, a journal section 45b having a C-shape in which the front as viewed from a direction along the steering shaft axis C2 opens, and a joining section 45c that extends so as to be positioned outward in the vehicle width direction as it goes upward from the upper end of the journal section 45b and joins the link front connection section 45a and the journal section 45b with each other. The reference sign 45La in FIG. 5 denotes an assist steering system link front connection section which is disposed on the left side in the vehicle width direction and to which the front end of an assist steering system link 73 forming the interlocking link 40 described below is connected. Also, the reference sign 45Ra in FIG. 5 denotes a steering system link front connection section which is disposed on the right side in the vehicle width direction and to which the front end of the steering system link 41 forming the interlocking link 40 is connected.

At the front end of the journal section 45b, an insertion hole that opens in the vehicle width direction is formed. For example, by screwing and fastening a bolt to a nut through the insertion hole in a state the journal section 45b is inserted to the upper end 16a of the steering shaft 16, the steering arm 45 is fastened and fixed to the upper end 16a of the steering shaft 16. The steering arm 45 is made turnable around the steering shaft axis C2 integrally with the front fork 17 accompanying the operation of the handlebar 18.

With reference to FIG. 5 and FIG. 6, the steering system link 41 is arranged on the right side in the vehicle width direction, and includes a steering system link member 42 having a linear shape extending forward and rearward as viewed from the top. At the front end of the steering system link member 42, a front ball joint 41F connected to the steering system link front connection section 45Ra is arranged. At the rear end of the steering system link member 42, a rear ball joint 41R connected to the steering system link rear connection section 38c is arranged.

In FIG. 3, front and rear ball joints 73F, 73R in the assist steering system link 73 having a configuration similar to that of the front and rear ball joints 41F, 41R in the steering system link 41 are shown. Similar to the front and rear ball joints 73F, 73R in the assist steering system link 73, the front and rear ball joints 41F, 41R include ball studs 43 and sockets 44. The ball stud 43 includes a ball section 43a having a spherical shape, and a stud section 43b that protrudes upward of the ball section 43a. The ball section 43a is slidably held in the inside of the socket 44. The stud section 43b extends linearly in the vehicle top-bottom direction. The socket 44 includes upper and lower sockets 44a, 44b. Between the upper and lower sockets 44a, 44b, the ball section 43a is held slidably.

With reference to FIG. 2, FIG. 3, and FIG. 5, in the steering system link front connection section 45Ra, an insertion hole is formed which opens in the vehicle top-bottom direction. By inserting a thread section of the upper end of the stud section 43b of the front ball joint 41F to the insertion hole of the steering system link front connection section 45Ra and screwing and fastening a nut to the upward protruding portion thereof, the stud section 43b of the front ball joint 41F is fastened and fixed to the steering system link front connection section 45Ra. Below, the center axis of the stud section 43b in the front ball joint will be referred to as "the first axis C4". The front end of the steering system link member 42 is connected to the steering system link front connection section 45Ra through the front ball joint 41F so as to be turnable around the first axis C4 (in other words, the center axis of the stud section 43b in the front ball joint 41F on the right side in the vehicle width direction).

In the steering system link rear connection section 38c, an insertion hole is formed which opens in the vehicle top-bottom direction. By inserting a thread section of the upper end of the stud section 43b of the rear ball joint 41R to the insertion hole of the steering system link rear connection section 38c and screwing and fastening a nut to the upward protruding portion thereof, the stud section 43b of the rear ball joint 41R is fastened and fixed to the steering system link rear connection section 38c. Below, the center axis of the stud section 43b in the rear ball joint will be referred to as "the second axis C5". The rear end of the steering system link member 42 is connected to the steering system link rear connection section 38c through the rear ball joint 41R so as to be turnable around the second axis C5 (in other words, the center axis of the stud section 43b in the rear ball joint 41R on the right side in the vehicle width direction).

In the present embodiment, the steering system link member 42 includes thread sections at the front and rear ends, and is fixed using lock nuts in a state the front and rear thread sections are screwed by a predetermined amount to the rear end of the lower socket 44b of the front ball joint 41F and the front end of the lower socket 44b of the rear ball joint 41R respectively. Thus, by loosening the lock nuts and increasing and reducing the screwing amount of the lower socket 44b and the thread sections, the distance between the front and rear connection sections of the steering system link member 42 can be adjusted.

With reference to FIG. 2, the swing arm 20 includes the upper and lower arms 21, 22 that extend in the vehicle longitudinal direction and are arranged so as to be vertically swingable. The upper and lower arms 21, 22 are disposed side by side in the vehicle top-bottom direction, and extend along the vehicle longitudinal direction. The front end 21a of the upper arm 21 is disposed on the outer side in the vehicle width direction of the upper part of the fork holder 15, and the front end 22a of the lower arm 22 is disposed on the inner side in the vehicle width direction of the lower part of the fork holder 15. The rear ends 21b, 22b of the upper and lower arms 21, 22 are disposed on the inner side in the vehicle width direction of the front part of the front block 3. The rear ends 21b, 22b of the upper and lower arms 21, 22 are stored within the lower open section 3s of said gate shape in the front block 3.

The front and rear ends 21a, 21b of the upper arm 21 are disposed forward of the front and rear ends 22a, 22b of the lower arm 22 in side view. In side view, the front end 21a of the upper arm 21 is positioned forward of the steering shaft axis C2, and the front end 22a of the lower arm 22 is positioned rearward of the steering shaft axis C2. The rear ends 21b, 22b of the upper and lower arms 21, 22 are swingably supported by the front part of the front block 3. The fork holder 15 is swingably connected to the front ends 21a, 22a of the upper and lower arms 21, 22.

With reference to FIG. 2 and FIG. 5, the upper and lower connection sections 15c, 15d of the fork holder 15 are swingably connected to the front ends 21a, 22a of the upper and lower arms 21, 22 through bolts 23a, 25a as joining shafts along the vehicle width direction. The bolt 23a penetrates the upper connection section 15c of the fork holder 15 and the front end 21a of the upper arm 21, and extends in the vehicle width direction. The bolt 25a penetrates the lower connection section 15d of the fork holder 15 and the front end 22a of the lower arm 22, and extends in the vehicle width direction. The reference sign C11 in FIG. 2 denotes the center axis of the bolt 23a that joins the upper connection section 15c of the fork holder 15 and the front end 21a of the upper arm 21. The reference sign C13 in FIG. 2 denotes the center axis of the bolt 25a that joins the lower connection section 15d of the fork holder 15 and the front end 22a of the lower arm 22.

The rear ends 21b, 22b of the upper and lower arms 21, 22 are swingably connected to the upper and lower connection sections 3a, 3b of the front block 3 through bolts 24a, 26a as joining shafts along the vehicle width direction. The bolt 24a penetrates the rear end 21b of the upper arm 21 and the upper connection section 3a of the front block 3, and extends in the vehicle width direction. The bolt 26a penetrates the rear end 22b of the lower arm 22 and the lower connection section 3b of the front block 3, and extends in the vehicle width direction. Because the rear ends 21b, 22b of the upper and lower arms 21, 22 are turnably supported through the bolts 24a, 26a that penetrate the front block 3 and extend along the vehicle width direction, the upper and lower arms 21, 22 can be supported with high rigidity. The reference sign C12 in FIG. 2 denotes the center axis of the bolt 24a that joins the rear end 21b of the upper arm 21 and the upper connection section 3a of the front block 3. The reference sign C14 in FIG. 2 denotes the center axis of the bolt 26a that joins the rear end 22b of the lower arm 22 and the lower connection section 3b of the front block 3.

Below, the center axis of the bolt 23a is referred to as "the first joining axis C11", the center axis of the bolt 24a is referred to as "the second joining axis C12", the center axis of the bolt 25a is referred to as "the third joining axis C13", and the center axis of the bolt 26a is referred to as "the fourth joining axis C14".

With reference to FIG. 2, in side view, a straight line passing through the first joining axis C11 and the second joining axis C12 is made "the first straight line AX1", and a straight line passing through the third joining axis C13 and the fourth joining axis C14 is made "the second straight line AX2". In side view, the first straight line AX1 of the upper arm 21 and the second straight line AX2 of the lower arm 22 are generally parallel to each other.

In side view, the front-rear length of the upper arm 21 is generally the same as the front-rear length of the lower arm 22. In other words, in side view, the length of the line segment connecting the first joining axis C11 and the second joining axis C12 is generally the same as the length of the line segment connecting the third joining axis C13 and the fourth joining axis C14. Thus, the fork holder 15 moves upward and downward generally in parallel with each other with respect to vertical swinging of the upper and lower arms 21, 22. The rear end 21b of the upper arm 21 (the second joining axis C12) and the front end 22a of the lower arm 22 (the third joining axis C13) are disposed between the steering shaft axis C2 and a stroke axis C3 described below in side view.

With reference to FIG. 2 and FIG. 5, the upper arm 21 includes, in an integrated manner, a pair of left and right upper arm bodies 21c that extend forward and rearward, and a cross member 21d that joins the rear ends 21b of the left and right upper arm bodies 21c. The respective elements of the upper arm 21 are components made of aluminum for example, and are formed so as to be integrated with each other.

The left and right upper arm bodies 21c are disposed on both left and right sides of the upper part of the fork holder 15. The left and right upper arm bodies 21c curve inward in the vehicle width direction so as to line the outer wall surface of the upper part of the fork holder 15.

At the front ends 21a of the left and right upper arm bodies 21c, insertion holes that open in the vehicle width direction are formed. In a state the upper connection section 15c of the fork holder 15 is sandwiched between the front ends 21a of the left and right upper arm bodies 21c, the bolt 23a is screwed and fastened to a nut 23b through the insertion holes (the insertion holes of the front ends 21a of the left and right upper arm bodies 21c) and the inner periphery of the upper connection section 15c. The upper connection section 15c of the fork holder 15 is supported by the front end 21a of the upper arm 21 through a collar and ball bearings (both are not illustrated) so as to be turnable around the first joining axis C11.

In the upper connection sections 3a of the left and right front blocks 3L, 3R, insertion holes that open in the vehicle width direction are formed. In a state the rear end 21b of the upper arm 21 (the rear end 21b of the left and right upper arm bodies 21c and the cross member 21d) is sandwiched between the upper connection sections 3a of the left and right front blocks 3L, 3R, the bolt 24a is screwed and fastened to a nut 24b through the insertion holes (the insertion holes of the upper connection sections 3a of the left and right front blocks 3L, 3R) and the inner periphery of the rear end 21b of the upper arm 21. The rear end 21b of the upper arm 21 is supported by the upper connection sections 3a of the left and right front blocks 3L, 3R through a collar and ball bearings (both are not illustrated) so as to be turnable around the second joining axis C12.

With reference to FIG. 2 and FIG. 5, the lower arm 22 includes, in an integrated manner, a pair of left and right lower arm bodies 22c that extend forward and rearward, a front cross member (not illustrated) that joins the front ends 22a of the left and right lower arm bodies 22c, and a rear cross member 22d that joins the rear ends 22b of the left and right lower arm bodies 22c. The respective elements of the lower arm 22 are components made of aluminum for example, and are formed so as to be integrated with each other. The left and right lower arm bodies 22c are disposed on both left and right sides of the lower part of the cushion member 27.

In the left and right lower connection sections 15d protruding rearward from the rear left and right parts of the fork holder 15, insertion holes that open in the vehicle width direction are formed. In a state the front end 22a of the left and right lower arm bodies 22c (the front end 22a of the left and right lower arm bodies 22c and the front cross member) is sandwiched between the left and right lower connection sections 15d, the bolt 25a is screwed and fastened to a nut (not illustrated) through the insertion holes (the insertion holes of the left and right connection sections 15d) and the inner periphery of the front end 22a of the left and right lower arm bodies 22c. The left and right lower connection sections 15d of the fork holder 15 are supported by the front end 22a of the lower arm 22 through a collar and ball bearings (both are not illustrated) so as to be turnable around the third joining axis C13.

In the lower connection section 3b of the front block 3, an insertion hole that opens in the vehicle width direction is formed. In a state the rear end 22b of the lower arm 22 (the rear end 22b of the left and right lower arm bodies 22c and the rear cross member 22d) is sandwiched between the lower connection sections 3b of the front block 3, the bolt 26a is screwed and fastened to a nut 26b through the insertion holes (the insertion holes of the lower connection sections 3b of the front block 3) and the inner periphery of the rear ends 22b of the lower arm 22. The rear end 22b of the lower arm 22 is supported by the lower connection sections 3b of the front block 3 through a collar and ball bearings (both are not illustrated) so as to be turnable around the fourth joining axis C14.

In the lower arm 22, behind the center part in the vehicle width direction of the front cross member and at the front ends 22a of the left and right lower arm bodies 22c, a cushion lower connection section 27d is formed to which a lower end 27b of the cushion member 27 is connected.

With reference to FIG. 2, the cushion member 27 includes a damper 27j of a rod type which inclines so as to be positioned rearward as it goes upward in side view, and a coil spring 27k that is wound around the periphery of the damper 27j. The cushion member 27 extends and shrinks by stroking along its center axis C3, and secures a predetermined damping action. Below, the center axis C3 is referred to as "stroke axis". The cushion upper connection section 27c is disposed rearward of the steering stem axis C1 so that the stroke axis C3 inclines rearward with respect to the vertical direction in side view.

The cushion member 27 makes the lower end 27b stroke accompanying swinging of the lower arm 22, and secures the damping action. The cushion member 27 is disposed forward and upward of an engine and rearward and upward of the front wheel 11 in side view. The upper part of the cushion member 27 is stored within the lower open section 3s of said gate shape in the front block 3. The upper end 27a of the cushion member 27 is covered by the front block 3 in side view.

With reference to FIG. 2 and FIG. 5, the upper end 27a of the cushion member 27 is swingably connected to the cushion upper connection section 27c of the left and right extension sections 33L, 33R, and the lower end 27b of the cushion member 27 is swingably connected to the cushion lower connection section 27d of the lower arm 22.

The upper end 27a of the cushion member 27 is swingably connected to the cushion upper connection section 27c of the left and right extension sections 33L, 33R through the bolt 34a as a joining shaft along the vehicle width direction. The bolt 34a penetrates the cushion upper connection section 27c and the upper end 27a of the cushion member 27, and extends in the vehicle width direction. The reference sign C15 in FIG. 2 denotes the center axis of the bolt 34a that joins the cushion upper connection section 27c and the upper end 27a of the cushion member 27.

In the cushion upper connection sections 27c of the left and right extension sections 33L, 33R, insertion holes that open in the vehicle width direction are formed. In a state where the upper end 27a of the cushion member 27 is sandwiched between the cushion upper connection sections 27c of the left and right extension sections 33L, 33R, the bolt 34a is inserted through the insertion holes (the insertion holes of the cushion upper connection sections 27c of the left and right extension sections 33L, 33R) and the inner periphery of the upper end 27a of the cushion member 27, and a nut (not illustrated) is screwed and fastened to the protruding portion thereof. The upper end 27a of the cushion member 27 is supported by the cushion upper connection sections 27c of the left and right extension sections 33L, 33R through a collar (not illustrated) so as to be turnable around the center axis C15.

The lower end 27b of the cushion member 27 is swingably connected to the left and right cushion lower connection sections 27d of the lower arm 22 through a bolt 28a as a joining shaft along the vehicle width direction. The bolt 28a penetrates the cushion lower connection sections 27d and the lower end 27b of the cushion member 27, and extends in the vehicle width direction. The reference sign C16 in FIG. 2 denotes the center axis of the bolt 28a that joins the cushion lower connection sections 27d and the lower end 27b of the cushion member 27.

In the left and right cushion lower connection sections 27d of the lower arm 22, insertion holes that open in the vehicle width direction are formed. In a state where the lower end 27b of the cushion member 27 is sandwiched between the left and right cushion lower connection sections 27d of the lower arms 22, the bolt 28a is inserted through the insertion holes (the insertion holes of the left and right cushion lower connection sections 27d of the lower arm 22) and the inner periphery of the lower end 27b of the cushion member 27, and a nut (not illustrated) is screwed and fastened to the protruding portion thereof. The lower end 27b of the cushion member is supported by the left and right cushion lower connection sections 27d of the lower arm 22 through a collar (not illustrated) so as to be turnable around the center axis C16.

Below, actions of the cushion member 27 will be described.

When the front wheel 11 deflects relatively upward by front wheel braking and the like from the 1G state in which a load of the vehicle weight portion is applied to the front wheel suspension device 10, the swing arm 20 swings upward, and the front fork 17 and the fork holder 15 deflect upward. At this time, the lower arm 22 turns rearward in the right turn (clockwise) in FIG. 2 around the fourth joining axis C14. Then, the lower arm 22 makes the lower end 27b of the cushion member 27 deflect upward, and compresses the cushion member 27.

When the fork holder 15 deflects upward, the steering arm 15 also deflects integrally responding it. At this time, although the steering system link member 42 (referring to FIG. 5) deflects with respect to the handlebar post 35 and the angle of the steering shaft axis C2 with respect to the steering stem axis C1 changes, this change is absorbed by swinging of the front and rear ball joints 41F, 41R and swinging of the steering system link member 42.

On the other hand, when the front wheel 11 deflects relatively downward by acceleration and the like from said 1G state, the swing arm 20 swings downward, and the front fork 17 and the fork holder 15 deflect downward. At this time, the lower arm 22 turns forward in the left turn (counter-clockwise) in FIG. 2 around the fourth joining axis C14. Then, the lower arm 22 makes the lower end 27b of the cushion member 27 deflect downward, and extends the cushion member 27.

When the fork holder 15 deflects downward, the steering arm 45 also deflects integrally responding it. At this time, although the steering system link member 42 deflects with respect to the handlebar post 35 and the angle of the steering shaft axis C2 with respect to the steering stem axis C1 changes, this change is absorbed by swinging of the front and rear ball joints 41F, 41R and swinging of the steering system link member 42.

With reference to FIG. 1, the steering system 60 further includes a power assist unit 70 that assists the steering force transmitted to the steering shaft 16. With reference to FIG. 2 and FIG. 5 together, the power assist unit 70 includes an assist motor 71 that generates a steering assist force assisting the steering force transmitted to the steering shaft 16, a steering assist force transmit member 72 that is turnably supported by the steering stem 39, an assist steering system link 73 that joins the steering arm 45 and the steering assist force transmit member 72, a steering assist force transmit mechanism 75 that transmits the steering assist force generated by the assist motor 71 (in other words, outputted by an output shaft 71b described below) to the steering assist force transmit member 72, a steering assist force transmit arm 78, and a steering assist force transmit rod 79. The steering system link 41 and the assist steering system link 73 form the interlocking link 40.

With reference to FIG. 2, the assist motor 71 is disposed adjacent to the assist steering system link 73 at the left side of the assist steering system link 73. The assist motor 71 is disposed between the steering shaft 16 and the steering stem 39 in side view. In other words, the assist motor 71 is disposed closer to the steering shaft axis C2 in the region between the steering stem axis C1 and the steering shaft axis C2 in side view.

The assist motor 71 includes a motor body 71a, and the output shaft 71b that outputs the rotative drive of the motor body 71a as the steering assist force. In the front upper part of the motor body 71a, a motor harness 71c is attached which is connected to an ECU 90 (referring to FIG. 5) described below. The motor body 71a and the output shaft 71b extend in a direction along the steering shaft axis C2 in side view. The motor body 71a is disposed downward of the front end of the steering assist force transmit mechanism 75. The output shaft 71b is oriented upward so as to protrude upward from the upper end of the motor body 71a. The lower part of the motor body 71a overlaps with the front-rear middle part of the upper arm body 21c in side view.

Below, the rotation axis of the assist motor 71 is made a motor axis Cm. The motor axis Cm agrees with the center axis of the motor body 71a that has a cylindrical shape. The motor axis Cm offsets (departs) rearward of the steering shaft axis C2 in side view. The motor axis Cm and the steering shaft axis C2 are generally parallel to each other.

With reference to FIG. 2 and FIG. 6, the steering assist force transmit member 72 is turned around the steering stem axis C1 accompanying the rotative drive of the assist motor 71. By turning of the steering assist force transmit member 72, the steering assist force is transmitted to the steering shaft 16 through the assist steering system link 73. By transmission of the steering assist force to the steering shaft 16, turning of the front fork 17 around the steering shaft axis C2 is assisted.

The steering assist force transmit member 72 has a thickness in a direction parallel to the steering stem axis C1, and has a shape of extending leftward and rearward in the radial direction (the direction orthogonal to the steering stem axis C1) as viewed from a direction along the steering stem 39. The steering assist force transmit member 72 is disposed downward of the steering force transmit member 38. The steering assist force transmit member 72 is supported by the steering stem 39 through a collar and ball bearings (both are not illustrated) so as to be turnable around the steering stem axis C1. At the front end (left end) of the left hand extension section of the steering assist force transmit member 72, an assist steering system link rear connection section 72c is formed to which the rear end of the assist steering system link 73 is connected. In the steering assist force transmit member 72, a steering assist force transmit member side extension section 72e is formed which extends rearward making the left-right center line the vehicle left-right center line CL as viewed from a direction along the steering stem 39. In the steering assist force transmit member side extension section 72e, a steering assist force transmit rod second connection section 72j is arranged to which the second end (one end) 79b of the steering assist force transmit rod 79 described below is connected.

The steering force transmit member 38 and the steering assist force transmit member 72 are disposed so that a part thereof overlaps vertically. In other words, the steering force transmit member 38 and the steering assist force transmit member 72 are disposed so that the steering force transmit member side extension section 38e and the steering assist force transmit member side extension section 72e overlap vertically. The left hand extension section of the steering assist force transmit member 72 (the assist steering system link rear connection section 72c) is exposed upward from the left side notch section of the steering force transmit member 38 as viewed from a direction along the steering stem 39.

With reference to FIG. 2, FIG. 5, and FIG. 6, the assist steering system link 73 includes an assist steering system link member 74 having a linear shape that extends forward and rearward in side view and top view. At the front end of the assist steering system link member 74, the front ball joint 73F is arranged which is connected to the assist steering system link front connection section 45La. At the rear end of the assist steering system link member 74, the rear ball joint 73R is arranged which is connected to the assist steering system link rear connection section 72c.

With reference to FIG. 2, the front and rear ball joints 73F, 73R include the ball studs 43 and the sockets 44. Because the ball stud 43 and the socket 44 in the front and rear ball joints 73F, 73R have a configuration same as that in the front and rear ball joints 41F, 41R described above, the detailed description thereof will be omitted.

With reference to FIG. 2, FIG. 5, and FIG. 6, in the assist steering system link front connection section 45La, an insertion hole that opens in the vehicle top-bottom direction is formed. By inserting the thread section of the upper end of the stud section 43b of the front ball joint 73F to the insertion hole of the assist steering system link front connection section 45La and screwing and fastening a nut to the upward protruding portion thereof, the stud section 43b of the front ball joint 73F is fastened and fixed to the assist steering system link front connection section 45La. The front end of the assist steering system link member 74 is connected to the assist steering system link front connection section 45La through the front ball joint 73F so as to be turnable around the first axis C4 (in other words, the center axis of the stud section 43b in the front ball joint 73F on the left side in the vehicle width direction).

In the assist steering system link rear connection section 72c, an insertion hole that opens in the vehicle top-bottom direction is formed. By inserting the thread section of the upper end of the stud section 43b of the rear ball joint 73R to the insertion hole of the assist steering system link rear connection section 72c and screwing and fastening a nut to the upward protruding portion thereof, the stud section 43b of the rear ball joint 73R is fastened and fixed to the assist steering system link rear connection section 72c. The rear end of the assist steering system link member 74 is connected to the assist steering system link rear connection section 72c through the rear ball joint 73R so as to be turnable around the second axis C5 (in other words, the center axis of the stud section 43b in the rear ball joint 73R on the left side in the vehicle width direction).

In the present embodiments, the assist steering system link member 74 includes thread sections at the front and rear ends, and is fixed using lock nuts in a state the front and rear thread sections are screwed by a predetermined amount to the rear end of the lower socket 44b of the front ball joint 73F and the front end of the lower socket 44b of the rear ball joint 73R respectively. Thus, by loosening the lock nut and increasing and reducing the screwing amount of the lower socket 44b and the thread section, the distance between the front and rear connection sections of the assist steering system link member 74 can be adjusted.

With reference to FIG. 3 and FIG. 5, the steering assist force transmit mechanism 75 includes a gear box 76 that stores speed reduction gears (not illustrated) in the inside, and a gear box cover 77 that covers the upper part of the gear box 76. The front upper part of the steering assist force transmit mechanism 75 overlaps with the front part of the assist steering system link 73 in side view.

The assist motor 71 and the steering assist force transmit mechanism 75 are disposed side by side in the vehicle longitudinal direction. As viewed from a direction along the steering stem 39, the assist motor 71 and the steering assist force transmit mechanism 75 are disposed adjacent to the assist steering system link 73 at the left side of the assist steering system link 73.

The gear box 76 has a thickness in a direction parallel to the motor axis Cm, and is arranged so as to incline rearward with respect to the vertical direction at the left side of the assist steering system link 73 in side view. In the gear box 76, a drive gear that is fixed coaxially with the output shaft 71b of the assist motor 71, an idle gear that engages with the drive gear, and a driven gear (all of them are not illustrated) that is rotatively driven through the idle gear are stored. The driven gear is coaxially fixed to a transmission shaft 76a that extends in parallel with the output shaft 71b. The transmission shaft 76a is disposed rearward of the output shaft 71b and leftward of the steering stem 39.

The gear box 76 includes, in an integrated manner, a front side storing section that is positioned on the front right side as viewed from a direction along the steering stem 39, stores the drive gear, and has a circular shape, a rear side storing section that is positioned in the rear part, stores the driven gear and the transmission shaft 76a, and has such a shape of combining a fan shape and a circular shape, and a middle storing section that is positioned in the front-rear middle part, stores the idle gear, and connects the front side storing section and the rear side storing section. In the upper outer peripheral part of the gear box 76 as viewed in a direction along the steering stem 39, gear box cover attaching sections of plural numbers (7 pieces for example in the present embodiment) for attaching the gear box cover 77 are formed so as to protrude outward with intervals along said upper outer peripheral part.

The gear box cover 77 has a thickness thinner than that of the gear box 76 along a direction parallel to the motor axis Cm. The gear box cover 77 is fastened and fixed to the gear box cover attaching sections in the gear box 76 by bolts 77a of plural numbers (7 pieces for example in the present embodiment) fastening from the vehicle upper side.

With reference to FIG. 2, FIG. 3, and FIG. 6, to the upper end of the transmission shaft 76a, the front end of the steering assist force transmit arm 78 is fixed which inclines rearward with respect to the vertical direction at the left side of the assist steering system link 73 in side view and extends forward and rearward as viewed from a direction along the steering stem 39. The steering assist force transmit arm 78 is made swingable around the transmission shaft 76a.

The steering assist force transmit arm 78 is formed so that the width thereof gently reduces as it departs from the transmission shaft 76a (so that the left-right width gently reduces as it goes rearward in FIG. 6) as viewed from a direction along the transmission shaft 76a. At the rear end of the steering assist force transmit arm 78, a steering assist force transmit rod first connection section 78j is arranged to which a first end 79a (the left end in the vehicle width direction) of the steering assist force transmit rod 79 is connected. Below, the center axis of the transmission shaft 76a is made a transmission axis C20. The transmission axis C20 and the motor axis Cm are generally parallel to each other.

With reference to FIG. 2 and FIG. 6, the steering assist force transmit rod 79 has a linear shape that extends in the vehicle width direction as viewed from a direction along the steering stem 39. The first end 79a (the left end in the vehicle width direction) of the steering assist force transmit rod 79 is connected to the steering assist force transmit rod first connection section 78j by the ball joint. The steering assist force transmit rod 79 is connected to the steering assist force transmit rod first connection section 78j through the ball joint so as to be turnable around a center axis C21 of a stud section (not illustrated) in the ball joint.

A second end 79b (the right end in the vehicle width direction) of the steering assist force transmit rod 79 is connected to the steering assist force transmit rod connection section 72j by the ball joint. The steering assist force transmit rod 79 is connected to the steering assist force transmit rod connection section 72j through the ball joint so as to be turnable around a center axis C22 of a stud section (not illustrated) in the ball joint. The respective center axes C21, C22 and the transmit axis C20 are generally parallel to each other.

With reference to FIG. 6, in the steering system link 41, a steering force detection sensor 42a is arranged which detects a steering force transmitted to the steering shaft 16. The steering force detection sensor 42a detects a tension force and a compression force applied in the axial direction of the steering system link member 42. The steering force detection sensor 42a is built in the steering system link member 42. For example, the steering force detection sensor 42a uses a strain gage type load cell. Also, the steering force detection sensor 42a is not limited to it, and a magnetostrictive type load cell and an electrostatic capacitance type load cell may be used.

With reference to FIG. 6, the detection value of the steering force detection sensor 42a is inputted to the ECU 90 (Electronic Control Unit) as a control unit that controls the motion of the assist motor 71. The ECU 90 is attached to the steering stem 39 through a first bracket 91 and a second bracket 92.

The first bracket 91 is disposed downward of the steering assist force transmit member 72. The first bracket 91 includes a fixed section 39a that is fixed to the steering stem 39, and left and right front side branching pieces 91b, 91c that branch left and right forward from the front part of the fixed section 39a and support the second bracket 92. The second bracket 92 includes a body section 92a that supports the ECU 90, and left and right rear side branching pieces 92b, 92c that branch left and right rearward from the rear part of the body section 92a and are supported by the left and right front side branching pieces 91b, 91c of the first bracket 91 respectively.

The ECU 90 controls the assist motor 71 based on the detection result of the steering force detection sensor 42a. The ECU detects a steering force (steering torque) of the handlebar applied to the steering shaft 16 from a detection value of the steering force detection sensor 42a, and drivingly controls the assist motor 71 so that the steering force does not become excessive.

For example, the ECU 90 drivingly controls the assist motor 71 so that the steering assist force that assists the steering force increases when the motorcycle is in a stopping state or in a low vehicle speed state, and drivingly controls the assist motor 71 so that the steering assist force reduces when the motorcycle is in a middle/high vehicle speed state. In other words, the ECU 90 drivingly controls the assist motor 71 so that the steering assist force increases as the vehicle speed of the motorcycle reduces, and drivingly controls the assist motor 71 so that the steering assist force reduces as the vehicle speed of the motorcycle increases. Thus, steering of the handlebar can be made light as the vehicle speed of the motorcycle reduces, and steering of the handlebar can be made heavy as the vehicle speed of the motorcycle increases.

Also, from the viewpoint of improving the handlebar operability when the motorcycle is in a stopping state or in a low vehicle speed state (from the viewpoint of facilitating handlebar operation at the time of parking for example), the ECU 90 may drivingly control the assist motor 71 using an intermediary value between the maximum value and the minimum value of the steering assist force as the steering assist force when the motorcycle is in a stopping state or in a low vehicle speed state.

With reference to FIG. 3 and FIG. 9, between the steering force transmit member 38 and the steering assist force transmit member 72, engage sections 38d, 72d (a steering force transmit member side engage section 38d and a steering assist force transmit member side engage section 72d) are arranged that allow the steering force transmit member 38 and the steering assist force transmit member 72 to engage with each other so that the steering assist force transmit member 72 are turned around the steering stem 39 accompanying turning of the steering force transmit member 38. The engage sections 38d, 72d are formed between the steering force transmit member side extension section 38e and the steering assist force transmit member side extension section 72e.

The steering force transmit member side engage section 38d is a recess that is recessed forward in a rectangular shape from the rear end of the steering force transmit member side extension section 38e as viewed from a direction along the steering stem 39. The steering assist force transmit member side engage section 72d is a projection that protrudes rearward and upward from the rear end of the steering assist force transmit member side extension section 72e in side view and has a rectangular shape that extends forward and rearward as viewed from a direction along the steering stem 39.

The steering force transmit member 38 and the steering assist force transmit member 72 are disposed with a gap 38s in the turning direction (the direction around the center axis C22) in the engage sections 38d, 72d. The gap 38s is a space between the inner peripheral surface of the steering force transmit member side engage section 38d that is a recess recessed in a rectangular shape as viewed from a direction along the steering stem 39 and the outer peripheral surface of the steering assist force transmit member side engage section 72d that is a projection having a rectangular shape that extends forward and rearward. The size of the gap 38s is made a constant size in said turning direction.

Figure 4:
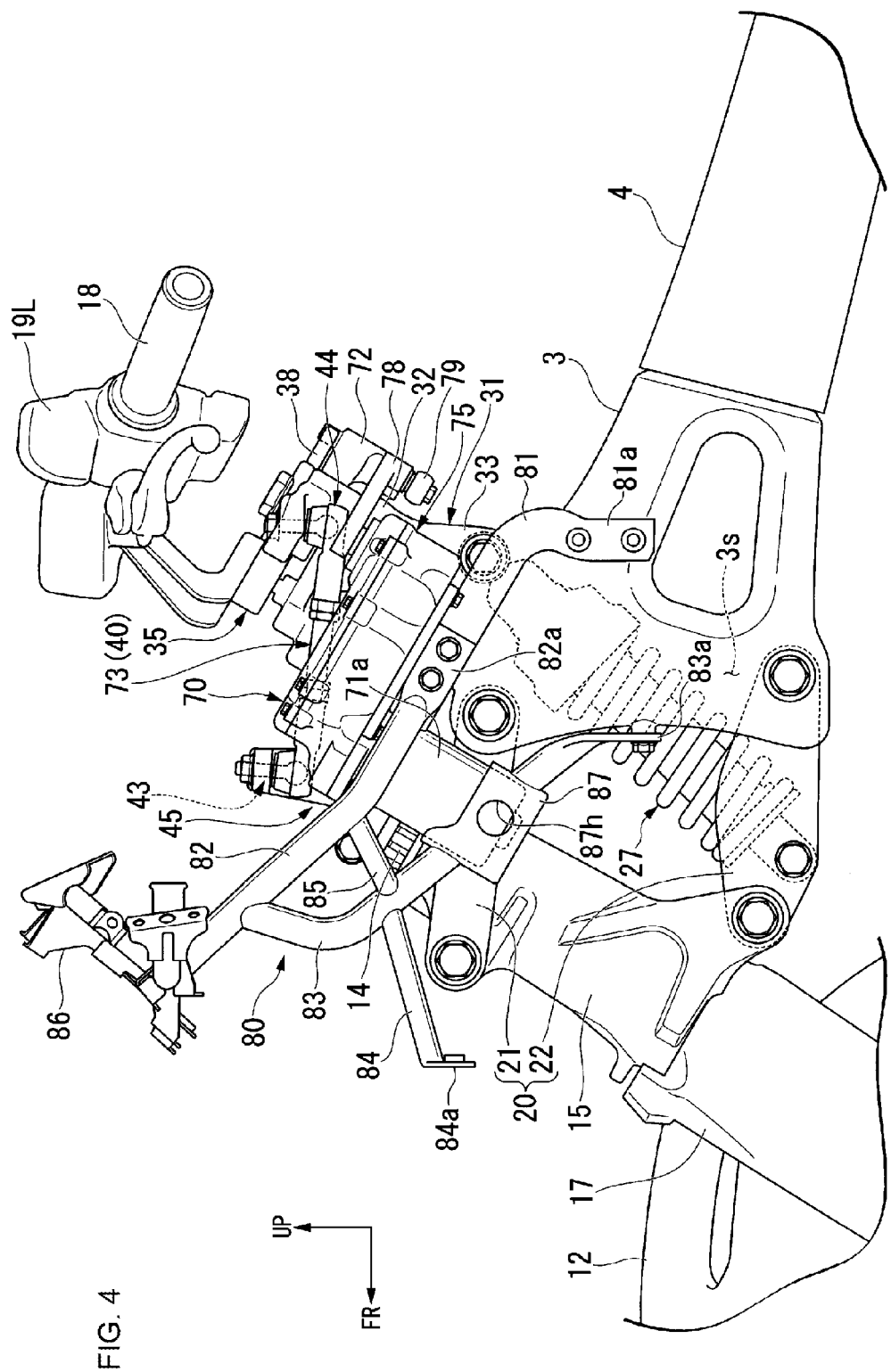
FIG. 4 is a left side view showing the steering system along with a stay.

With reference to FIG. 4, to the body frame 1, a stay 80 is attached which supports vehicle components. The stay 80 includes a first stay 81 in which a lower end 81a is fastened and fixed to the left side part of the front block 3 by bolts of plural numbers (2 pieces for example in the present embodiment) arrayed vertically and which curves rearward and upward from the fastening part of the upper bolt in side view and thereafter curves and extends forward and upward, a second stay 82 in which a rear lower end 82a is fastened and fixed to the front upper end of the first stay 81 by bolts of plural numbers (2 pieces for example in the present embodiment) arrayed in front and rear and which gently inclines and extends forward and upward from the fastening part of the front bolt in side view and thereafter curves forward and upward to extend forward and upward more sharply than in the rear side, a third stay 83 in which a lower end 83a is fastened and fixed to the front end of the front block 3 by a bolt from the front, which extends upward from the fastening part of the bolt in side view, thereafter curves and extends forward and upward, thereafter curves and extends rearward and upward, and in which the upper end is weld-joined to the front upper part of the second stay 82, a fourth stay 84 in which a head light support section 84a that supports a head light (not illustrated) is arranged at the front lower end, which inclines gently and extends rearward and upward from a head light support section 84a in side view, and in which the rear upper end is weld-joined to the front lower part of the third stay 83, and a sub-stay 85 which extends between the curved part of the second stay 82 and the front lower part of the third stay 83, and inclines and extends so as to be positioned downward as it goes forward in side view with the front end being weld-joined to the front lower part of the third stay 83 and with the rear end being weld-joined to the curved part of the second stay 82.

At the front upper end of the second stay 82, a vehicle component attaching section 86 is arranged which supports vehicle components such as a front cowl 9, a visor, and a meter unit (all of them are not illustrated). At the rear lower part of the third stay 83, an assist motor support section 87 is arranged which supports the assist motor 71. The assist motor support section 87 has a cylindrical shape that can store the lower part of the motor body 71a. In the assist motor support section 87, an opening section 87h is formed which opens in the vehicle width direction and forms a circular shape in side view.

Also, from the viewpoint of effectively reducing the vibration of the assist motor 71, the assist motor support section 87 may be configured to support the lower part of the motor body 71a through an elastic member such as rubber or a damping material obtained by foaming a synthetic resin and the like (both are not illustrated).

As described above, according to the above-described embodiments, in the steering system 60 of a saddle-ride type vehicle including the front fork 17 that includes the steering shaft 16 at the upper end and supports the front wheel 11 at the lower end, the steering arm 45 that is attached to the steering shaft 16, the steering force transmit member 38 that is turnably supported by the steering stem 39 that is arranged in the body frame 1, and the steering system link 41 that joins the steering arm 45 and the steering force transmit member 38, the assist motor 71 that generates a steering assist force that assists a steering force transmitted to the steering shaft 16, the steering assist force transmit member 72 that is turnably supported by the steering stem 39, and the assist steering system link 73 that joins the steering arm 45 and the steering assist force transmit member 72 are further provided, and the assist motor 71 is disposed adjacent to the assist steering system link 73.

According to this configuration, because the assist motor 71 is disposed adjacent to the assist steering system link 73, a space adjacent to the assist steering system link 73 can be effectively utilized in disposing the assist motor 71, and therefore enlargement of the steering system 60 can be suppressed.

Also, according to the above-described embodiments, because the assist motor 71 is disposed between the steering shaft 16 and the steering stem 39 in side view, the assist motor 71 comes to be positioned rearward of the front fork 17, and therefore the assist motor 71 can be protected easily.

Also, according to the above-described embodiments, because at least a part of the assist motor 71 overlaps with the swing arm 20 in side view, a space at the side of the swing arm 20 can be effectively utilized in disposing the assist motor 71, and therefore the assist motor 71 can be disposed compactly.

Also, according to the above-described embodiments, because the motor body 71a is disposed downward of the steering assist force transmit mechanism 75 and the output shaft 71b is directed upward, compared to the case the motor body 71a is disposed upward of the steering assist force transmit mechanism 75 and the output shaft 71b is directed downward, the motor body 71a that is relatively heavy in the assist motor 71 can be disposed at a low position, and therefore the position of the center of gravity of the vehicle can be lowered.

Also, according to the above-described embodiments, because at least a part of the steering assist force transmit mechanism 75 overlaps with the assist steering system link 73 in side view, a space at the side of the assist steering system link 73 can be effectively utilized in disposing the steering assist force transmit mechanism 75, and therefore the steering assist force transmit mechanism 75 can be disposed compactly.

Also, according to the above-described embodiments, because the assist motor support section 87 that supports the assist motor 71 is arranged in the stay 80, compared to the case a support member for supporting the assist motor 71 is arranged separately and independently, the number of pieces of components can be suppressed. Further, compared to the case the assist motor 71 is not supported, the vibration of the assist motor 71 can be reduced.

Also, the present invention is not limited to the above embodiments. For example, in the saddle-ride type vehicle, general vehicles in which a rider sits astride a vehicle body are included, and, not only motorcycles (including motor-assisted bicycles and scooter-type vehicles) but also three-wheeled vehicles (in addition to one front wheel and two rear wheel vehicles, two front wheel and one rear wheel vehicles are included) are included.

Further, the configuration in the above embodiments is an example of the present invention, and various alterations are possible within a scope not deviating from the substance of the present invention such that the constituent element of the embodiment is substituted by a known constituent element.

REFERENCE SIGNS LIST

1 . . . Body frame
11 . . . Front wheel
15 . . . Fork holder
16 . . . Steering shaft
17 . . . Front fork
18 . . . Handlebar
20 . . . Swing arm
38 . . . Steering force transmit member
38a . . . Handlebar attaching section
38d . . . Engage section
38e . . . Steering force transmit member side extension section
38s . . . Gap
39 . . . Steering stem
41 . . . Steering system link
42 . . . Steering system link member
42a . . . Steering force detection sensor
45 . . . Steering arm
45La . . . Assist steering system link front connection section
45Ra . . . Steering system link front connection section
60 . . . Steering system
71 . . . Assist motor
71a . . . Motor body
71b . . . Output shaft
72 . . . Steering assist force transmit member
72d . . . Engage section
72e . . . Steering assist force transmit member side extension section
72j . . . Steering assist force transmit rod second connection section
73 . . . Assist steering system link
75 . . . Steering assist force transmit mechanism
79 . . . Steering assist force transmit rod
79b . . . Second end (one end) of steering assist force transmit rod
80 . . . Stay
87 . . . Assist motor support section

The invention claimed is:

1. A steering system of a saddle-ride type vehicle, said system comprising:
a front fork that includes a steering shaft at an upper end and supports a front wheel at a lower end;
a steering arm attached to the steering shaft;
a steering force transmit member that is turnably supported by a steering stem that is disposed in a body frame;
a steering system link that joins the steering arm and the steering force transmit member;
an assist motor configured to generate a steering assist force that assists a steering force transmitted to the steering shaft;
a steering assist force transmit member that is turnably supported by the steering stem; and
an assist steering system link that joins the steering arm and the steering assist force transmit member,
wherein the assist motor is disposed adjacent to the assist steering system link.

2. The steering system of a saddle-ride type vehicle according to claim 1,
wherein the assist motor is disposed between the steering shaft and the steering stem in side view.

3. The steering system of a saddle-ride type vehicle according to claim 1,
wherein the body frame is connected to a rear end of a swing arm that extends vehicle forward and rearward and is made vertically swingable,
wherein a front end of the swing arm is connected to a fork holder that steerably supports the front fork, and
wherein at least a part of the assist motor overlaps with the swing arm in side view.

4. The steering system of a saddle-ride type vehicle according to claim 1,
wherein the assist motor includes a motor body, and an output shaft that is configured to output rotational drive of the motor body as the steering assist force,
wherein a steering assist force transmit mechanism is configured to transmit the steering assist force outputted by the output shaft to the steering shaft is provided,
wherein the motor body is disposed downward of the steering assist force transmit mechanism, and
wherein the output shaft is directed upward.

5. The steering system of a saddle-ride type vehicle according to claim 4, wherein at least a part of the steering assist force transmit mechanism overlaps with the assist steering system link in side view.

6. The steering system of a saddle-ride type vehicle according to claim 1, further comprising
a stay configured to support vehicle components, said stay being attached to the body frame,
wherein the stay is provided with an assist motor support section that supports the assist motor.

7. A steering system of a saddle-ride type vehicle, said system comprising:
front fork means including steering shaft means at an upper end thereof, said front fork means for supporting a front wheel at a lower end thereof;
steering arm means attached to the steering shaft means;
steering force transmit means for being turnably supported by steering stem means disposed in a body frame;
steering system link means for joining the steering arm means and the steering force transmit means;
assist motor means for generating a steering assist force that assists a steering force transmitted to the steering shaft means;
steering assist force transmit means for being turnably supported by the steering stem means; and
assist steering system link means for joining the steering arm means and the steering assist force transmit means,
wherein the assist motor means is disposed adjacent to the assist steering system link means.

8. The steering system of a saddle-ride type vehicle according to claim 7, wherein the assist motor means is disposed between the steering shaft means and the steering stem means in side view.

9. The steering system of a saddle-ride type vehicle according to claim 7,
wherein the body frame is connected to a rear end of a swing arm means that extends vehicle forward and rearward and is vertically swingable,
wherein a front end of the swing arm means is connected to a fork holder means for steerably supporting the front fork means, and
wherein at least a part of the assist motor means overlaps with the swing arm means inside view.

10. The steering system of a saddle-ride type vehicle according to claim 7,
wherein the assist motor means includes a motor body means and an output shaft means for outputting rotational drive of the motor body means as the steering assist force,
wherein a steering assist force transmit means is for transmitting the steering assist force output by the output shaft means to the steering shaft means,
wherein the motor body means is disposed downward of the steering assist force transmit means, and
wherein the output shaft means is directed upward.

11. The steering system of a saddle-ride type vehicle according to claim 10, wherein at least a part of the steering assist force transmit means overlaps with the assist steering system link means inside view.

12. The steering system of a saddle-ride type vehicle according to claim 7, further comprising:
stay means for supporting vehicle components, said stay means being attached to the body frame,
wherein the stay means includes an assist motor support means for supporting the assist motor means.

* * * * *